United States Patent [19]
Ide

[11] Patent Number: 4,789,198
[45] Date of Patent: Dec. 6, 1988

[54] FRONT STRUCTURE OF VEHICLE BODY

[75] Inventor: Yoshikazu Ide, Hiroshima, Japan

[73] Assignee: Mazda Motor Corporation, Hiroshima, Japan

[21] Appl. No.: 71,759

[22] Filed: Jul. 9, 1987

[30] Foreign Application Priority Data

Jul. 11, 1986 [JP] Japan .................... 61-163373

[51] Int. Cl.[4] .................................. B62D 27/00
[52] U.S. Cl. ..................... 296/192; 296/188; 296/194
[58] Field of Search ............... 296/194, 192, 188, 195

[56] References Cited

U.S. PATENT DOCUMENTS

| | | | |
|---|---|---|---|
| 2,664,308 | 12/1953 | Appel | 296/192 |
| 4,078,840 | 3/1978 | Ito | 296/192 |
| 4,270,793 | 6/1981 | Harasaki | 296/192 |
| 4,717,198 | 1/1988 | Komatsu | 296/192 |

FOREIGN PATENT DOCUMENTS

| | | | |
|---|---|---|---|
| 11174 | 1/1982 | Japan | 296/192 |
| 58-115468 | 8/1983 | Japan . | |
| 11976 | 1/1984 | Japan | 296/194 |
| 26369 | 2/1984 | Japan | 296/194 |

Primary Examiner—Robert R. Song
Attorney, Agent, or Firm—Gerald J. Ferguson, Jr.

[57] ABSTRACT

An open cowl type front structure of a vehicle body includes a dashboard panel which defines a part of the open cowl structure. The dashboard panel is provided with a closed cross-section portion extending in the transverse direction of the vehicle body along the open cowl structure. A front frame is mounted on a wheel apron defining a side wall of an engine compartment formed on the front side of the dashboard panel and extends in the longitudinal direction of the vehicle body in the engine compartment. A reinforcement connects the closed cross-section portion with the front frame.

9 Claims, 3 Drawing Sheets

FRONT STRUCTURE OF VEHICLE BODY

BACKGROUND OF THE INVENTION

1. Field of the Invention

This invention relates to a front structure of a vehicle body, and more particularly to an open cowl type front structure of a vehicle body.

2. Description of the Prior Art

In view of the fact that the vehicle body supports the overall weight of the vehicle and determines the overall shape of the vehicle, the vehicle body must be provided with sufficient strength and rigidity, while on the other hand, from the viewpoint of fuel economy and running performance, it is preferred that the vehicle body be as light as possible. In order to satisfy these conflicting requirements, various vehicle body structures have been proposed. For example, there has been disclosed in Japanese Unexamined Utility Model Publication No. 58(1983)-115468 a vehicle body structure in which the strength of the vehicle body is increased by providing on the front portion of the vehicle body a front frame which has a closed cross-section and extends in the longitudinal direction of the vehicle body along a front wheel apron, and the rear end of which abuts against a dashboard panel separating the passenger compartment from the engine compartment.

Further it has been known to connect a cowl panel to the upper portion of the dashboard panel to form a cowl structure having a closed cross-section and extending in the transverse direction of the vehicle body. With the cowl structure, a portion for supporting the lower edge of the windshield and a portion for supporting the wiper system can be strengthened. On the other hand, in order to conceal the wiper blade inside the vehicle body for the purpose of lowering air resistance and improving the external appearance, an open cowl structure having an opening in the upper wall portion is commonly employed. In such a case, a closed cross-section is generally formed on the upper portion of the dashboard panel in order to compensate for reduction in the strength and rigidity of the cowl portion resulting from formation of the opening.

With such a structure, the portion about the front wheel apron is reinforced by the front frame, and the portion for supporting the lower edge of the windshield is reinforced by the open cowl structure having the closed cross-section extending in the transverse direction of the vehicle body. However, the portions are only separately reinforced, and accordingly, the strength and the rigidity of the portion between the cowl portion and the front frame are insufficient as compared with those of the portions about the cowl portion and the front frame.

SUMMARY OF THE INVENTION

In view of the foregoing observations and description, the primary object of the present invention is to provide a front structure of a vehicle body in which the portion between the open cowl portion and the front wheel apron is reinforced so that the strength and the rigidity of the overall vehicle body are increased.

In accordance with the present invention, there is provided an open cowl type front structure of a vehicle body comprising a dashboard panel which defines a part of the open cowl structure and is provided with a closed cross-section portion extending in the transverse direction of the vehicle body along the open cowl structure, a wheel apron which defines a side wall of an engine compartment formed on the front side of the dashboard panel, a front frame which is mounted on the wheel apron to extend in the longitudinal direction of the vehicle body in the engine compartment, and a reinforcement connecting the closed cross-section portion with the front frame.

DESCRIPTION OF THE PREFERRED EMBODIMENT

Figure 1:
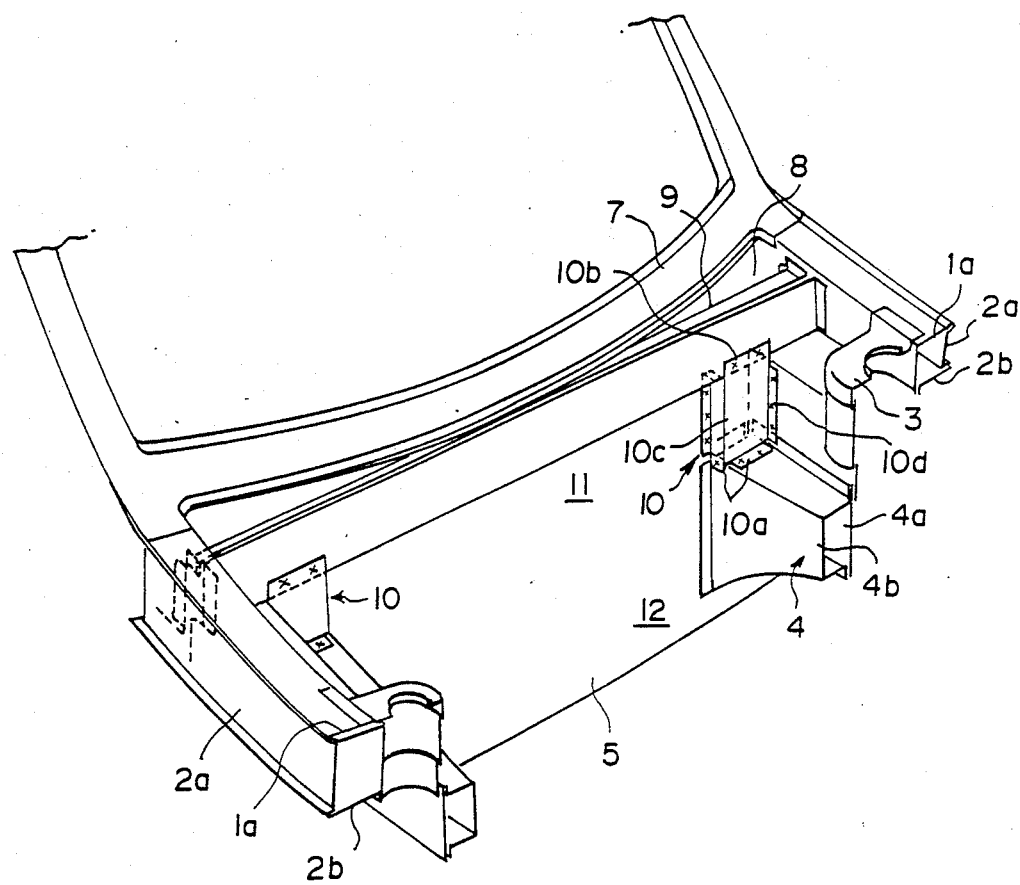
FIG. 1 is a perspective, partly cut-away view of a front structure of a vehicle body in accordance with an embodiment of the present invention.
Figure 2:
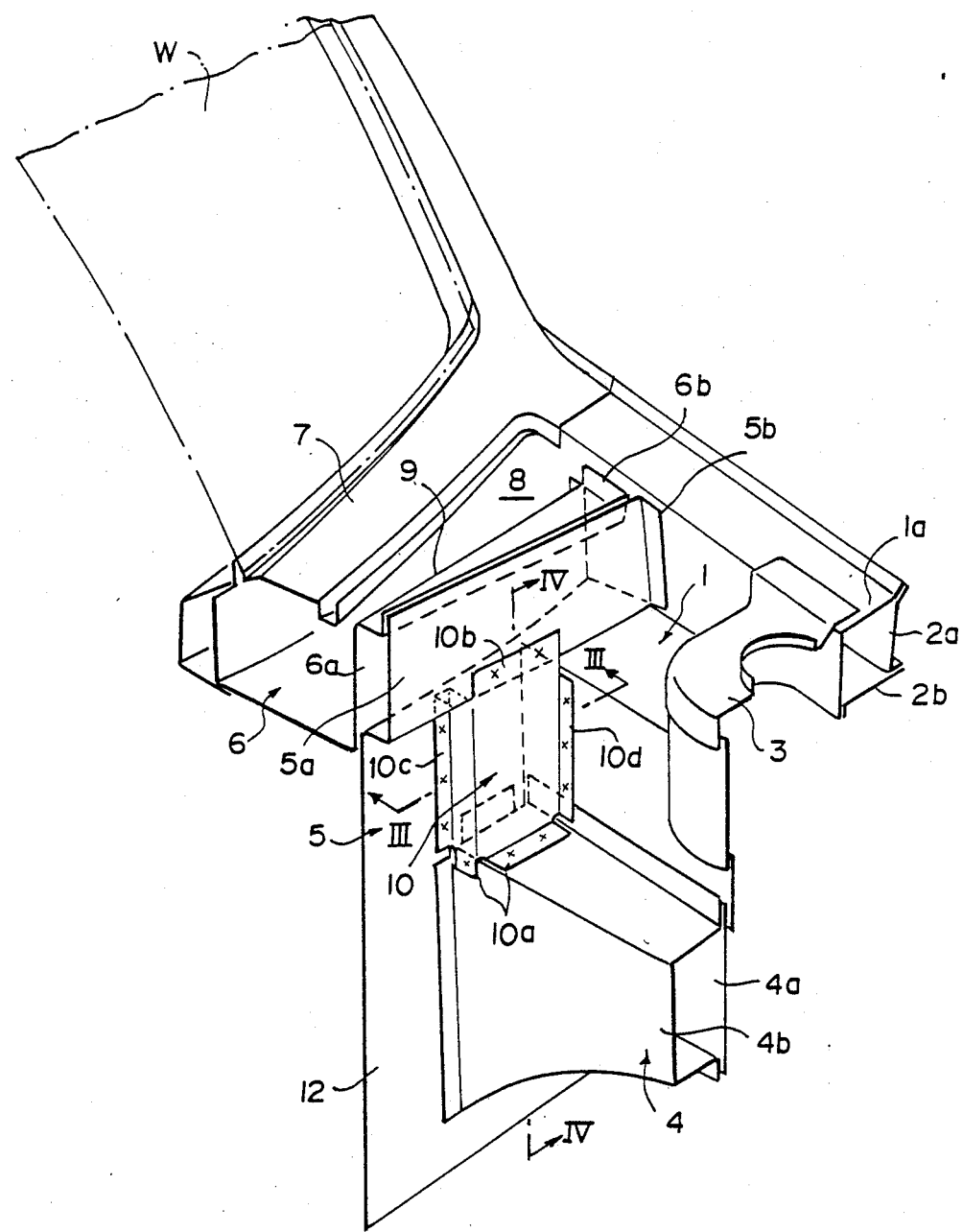
FIG. 2 is a fragmentary perspective view, partly cut-away, showing a part of the front structure.
Figure 3:
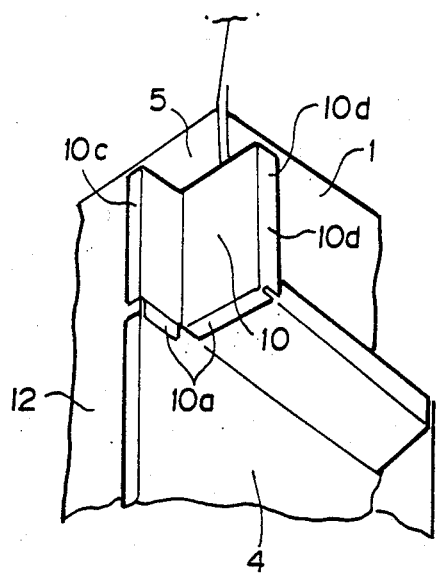
FIG. 3 is a cross-sectional view taken along line III—III in FIG. 2.
Figure 4:
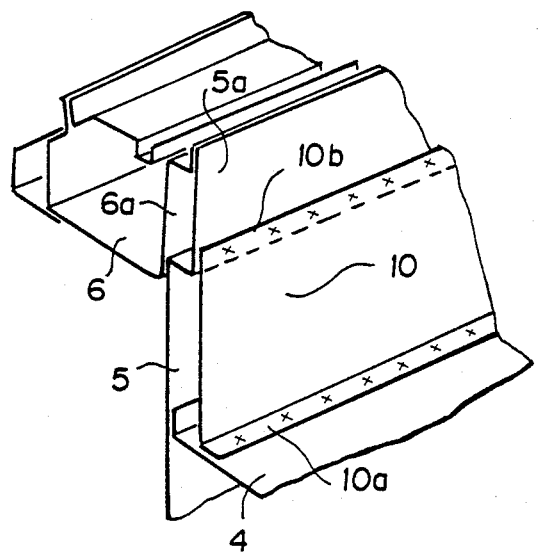
FIG. 4 is a cross-sectional view taken along line IV—IV in FIG. 2.

In FIGS. 1 to 4, a dashboard lower panel 5 is vertically provided to extend in the transverse direction of the vehicle body and separates a passenger compartment 11 from an engine compartment 12. A wheel apron 1 provided to cover a front wheel (not shown) defines a side wall of the engine compartment 12. A pair of apron reinforcements 2a and 2b are connected to the outer edge 1a of the wheel apron 1 to form a closed cross-section extending in the longitudinal direction of the vehicle body on one side thereof. A suspension tower 3 for mounting a front suspension is mounted on the wheel apron 1. To the inner side surface of the wheel apron 1 is connected a front frame 4 extending in the longitudinal direction of the vehicle body. The front frame 4 is a member having a closed cross-section formed by a pair of plate members 4a and 4b and the rear end of the front frame 4 is butt-welded to the dashboard lower panel 5.

A cowl panel 7 is connected to a dashboard upper panel 6 to form a cowl portion for supporting the lower edge of a windshield W. The cowl portion is of an open cowl type and is provided with an opening 8 which faces upward and extends in the transverse direction of the vehicle body. The front portion 6a of the dashboard upper panel 6 and the upper portion 5a of the dashboard lower panel 5 together form a closed cross-section portion 9 extending in the transverse direction of the vehicle body along the open cowl structure, thereby compensating for insufficiency of the rigidity of the open cowl structure. The closed cross-section portion 9 is connected at each end to the closed cross-section formed by the outer edge 1a of the wheel apron 1 and the apron reinforcements 2a and 2b on each side of the vehicle body as clearly shown in FIG. 1.

Further, in order to increase the strength and the rigidity of the portion between the cowl structure and the portion about the front frame 4, the closed cross-section portion 9 and the front frame 4 are fixedly connected together by a reinforcement 10. The reinforcement 10 is connected to the rear end portion of the front frame 4 at the lower end 10a to the upper portion 5a of the dashboard lower panel 5 forming the closed cross-section portion 9 at the upper end 10b. Further, opposite side portions 10c and 10d of the reinforcement 10 are respectively connected to the wheel apron 1 and the dashboard lower panel 5. The reinforcement 10, the wheel apron 1 and the dashboard lower panel 5 thus form a vertical closed cross-section which fixedly connects the front frame 4 to the closed cross-section portion 9 formed on the upper portion of the dashboard lower panel 5.

I claim:

1. A front structure of a vehicle body having an open cowl structure for supporting the lower edge of a windshield comprising a dashboard panel having an upper dashboard member which defines a part of the open cowl structure and a lower dashboard member, said upper dashboard member includes a vertical wall portion and said lower dashboard member includes an upper vertical wall portion, said vertical wall portions forming a closed cross-section portion extending in the transverse direction of the vehicle body along the open cowl structure, a wheel apron which defines a side wall of an engine compartment formed on the front side of the dashboard panel, a front frame which has a closed cross-section and is mounted on the wheel apron to extend in the longitudinal direction of the vehicle body in the engine compartment, a wheel apron reinforcement having a closed cross-section which extends in the longitudinal direction of the vehicle body is mounted outside said front frame with said closed cross-section portion formed by said dashboard members being attached to said wheel apron reinforcement, and a reinforcement connecting the closed cross-section portion with the front frame.

2. A front frame structure as defined in claim 1 in which said closed cross-section portion provided on the dashboard panel is connected between right and left wheel apron reinforcements, each of said wheel apron reinforcements being fixed to the wheel apron to form said closed cross-section together therewith.

3. A front structure as defined in claim 1 in which said reinforcement is connected to the wheel apron at one side edge thereof.

4. A front structure as defined in claim 1 in which an upper end and one side of said reinforcement are connected to the lower dashboard member, an other side edge of said reinforcement being connected to the wheel apron and a lower end of said reinforcement being connected to the front frame.

5. A front structure as defined in claim 4 in which said reinforcement, the lower dashboard member, the wheel apron and the front frame form a closed cross-section.

6. A front structure as defined in claim 5 in which said closed cross-section formed by the reinforcement, the lower dashboard member, the wheel apron and the front frame is disposed at a corner formed by the lower dashboard member, the front frame and the wheel apron.

7. A front structure of a vehicle body comprising an open cowl structure for supporting the lower edge of a windshield including a bottom wall and a vertical wall extending upwardly from a front edge of said bottom wall, said vertical wall having an upper edge which is bent in the forward direction, a dashboard panel including a dashboard upper panel and a dashboard lower panel with said dashboard upper panel being connected to a lower portion of said vertical wall and includes a bent portion extending in a forward direction from said connection with said lower portion of said vertical wall, and a vertical portion which extends upwardly from a front edge of said bent portion, said vertical portion being connected to a forward edge of said upper edge of said vertical wall of said bent portion, said vertical portion being connected to a forward edge of said upper edge of said vertical wall of said open cowl structure to form a closed cross-section portion extending in the transverse direction of the vehicle body along the open cowl structure, a wheel apron which defines a side wall of an engine compartment formed on the front side of the dashboard panel, a front frame which has a closed cross-section and is mounted on the wheel apron to extend in the longitudinal direction of the vehicle body in the engine compartment with a rear end of said front frame being connected to said dashboard lower panel, and a reinforcement connected at one side thereof to said dashboard lower panel, at an upper end thereof to said dashboard upper panel, at an other side thereof to said wheel apron and at a lower side thereof to said front frame with said reinforcement, said dashboard upper panel, said wheel apron and said front frame forming a closed cross-section.

8. A front frame structure as defined in claim 7 in which said closed cross-section portion provided on the dashboard panel is connected between right and left wheel apron reinforcements, each of said wheel apron reinforcements being fixed to the wheel apron to form said closed cross-section together therewith, 9. A front structure as defined in claim 7 in which said closed cross-section formed by the reinforcement, the lower dashboard member, the wheel apron and the front frame is disposed at a corner formed by the lower dashboard member, the front frame and the wheel apron.

* * * * *